(12) United States Patent
Kometani (10) Patent No.: US 8,226,088 B2
(45) Date of Patent: Jul. 24, 2012

(54) FLOATING SEAL

(75) Inventor: Yukio Kometani, Osaka (JP)

(73) Assignee: Komatsu, Ltd., Tokyo (JP)

( * ) Notice: Subject to any disclaimer, the term of this patent is extended or adjusted under 35 U.S.C. 154(b) by 693 days.

(21) Appl. No.: 12/304,330

(22) PCT Filed: Jun. 7, 2007

(86) PCT No.: PCT/JP2007/061559
§ 371 (c)(1),
(2), (4) Date: Dec. 11, 2008

(87) PCT Pub. No.: WO2007/145135
PCT Pub. Date: Dec. 21, 2007

(65) Prior Publication Data
US 2009/0212500 A1 Aug. 27, 2009

(30) Foreign Application Priority Data

Jun. 16, 2006 (JP) ................................. 2006-167509

(51) Int. Cl.
*F16J 15/34* (2006.01)
*F16J 15/38* (2006.01)

(52) U.S. Cl. ........ 277/377; 277/380; 277/381; 277/382; 277/652

(58) Field of Classification Search .................. 277/377, 277/380–382, 652
See application file for complete search history.

(56) References Cited

U.S. PATENT DOCUMENTS

| | | | | |
|---|---|---|---|---|
| 3,273,901 A | * | 9/1966 | Schmengler | 277/381 |
| 3,322,433 A | * | 5/1967 | Rentschler | 277/652 |
| 3,549,156 A | * | 12/1970 | Van Vleet et al. | 277/652 |
| 3,595,572 A | * | 7/1971 | Granda | 277/381 |
| 3,767,214 A | * | 10/1973 | Kawamura | 277/358 |
| 4,194,795 A | * | 3/1980 | Rife | 384/93 |
| 4,256,315 A | * | 3/1981 | Larson et al. | 277/381 |
| 4,753,304 A | * | 6/1988 | Kelly, Jr. | 175/371 |
| H1180 H | * | 5/1993 | Arianoutsos et al. | 277/381 |
| 5,494,301 A | * | 2/1996 | Hamilton et al. | 277/652 |
| 5,642,890 A | * | 7/1997 | Zutz | 277/380 |
| 6,053,506 A | * | 4/2000 | Zutz | 277/651 |
| 6,789,803 B2 | * | 9/2004 | Radosav | 277/377 |

(Continued)

FOREIGN PATENT DOCUMENTS

DE 3446542 A1 7/1986

(Continued)

OTHER PUBLICATIONS

Chinese Office Action dated Jul. 28, 2010 for corresponding Chinese patent Application No. 200780022451.3.

(Continued)

*Primary Examiner* — Alison Pickard (74) *Attorney, Agent, or Firm* — Fox Rothschild, LLP (57) ABSTRACT

To prevent premature wear and damage of elastic rings caused by fine grained soil, floating rings 22, 24 are supported by corresponding housings 20, 21 through associated elastic rings 23, 25. The elasticity of the elastic rings causes the floating rings 22, 24 to contact each other. When the housings rotate relative to each other, the floating rings 22, 24 slide with respect to each other. An elastic layer 28, 29 is arranged on a contact surface of a portion of a contact surface of each floating ring 22, 24 or a contact surface of each housing 20, 21 with respect to the corresponding elastic ring located closer to an opposing portion 22a, 24a of the floating ring 22, 24.

6 Claims, 8 Drawing Sheets

U.S. PATENT DOCUMENTS

| | | | |
|---|---|---|---|
| 7,093,836 B2 * | 8/2006 | Tsuboi et al. | 277/377 |
| 7,464,968 B2 * | 12/2008 | Sakazaki et al. | 285/242 |
| 7,581,734 B1 * | 9/2009 | McLeod | 277/352 |
| 7,681,889 B2 * | 3/2010 | Tsuboi et al. | 277/377 |
| 2002/0106526 A1 * | 8/2002 | Kuramoto et al. | 428/520 |
| 2004/0256808 A1 | 12/2004 | Tsuboi | |
| 2009/0212500 A1 * | 8/2009 | Kometani | 277/380 |

FOREIGN PATENT DOCUMENTS

| | | | |
|---|---|---|---|
| GB | 2029518 A | | 3/1980 |
| JP | 62-25374 | | 2/1987 |
| JP | 62-25375 | | 2/1987 |
| JP | 06033218 | | 2/1994 |
| JP | 10281298 | A | 10/1998 |
| JP | 11-051198 | | 2/1999 |
| JP | 2004316795 | | 11/2004 |
| JP | 2005-009530 | | 1/2005 |
| JP | 2005076877 | | 3/2005 |
| JP | 2005282820 | | 10/2005 |

OTHER PUBLICATIONS

A Search Report dated May 2, 2011 in corresponding EP Application No. 07744888.4.

European Office Action dated Dec. 8, 2011, for related International Application No. 07 744 888.4-2421.

Office Action dated Mar. 13, 2012 issued in related Japanese patent Application No. 2006-167509 with an English translation of excerpts of the Office Action provided.

* cited by examiner

FLOATING SEAL

FIELD OF THE INVENTION

The present invention relates to a floating seal incorporated in a drive wheel driving a track chain, carrier rollers supporting the track chain, and track rollers of a crawler-type working machine such as a hydraulic shovel or a crawler dozer.

BACKGROUND OF THE INVENTION

Conventionally, as this type of floating seal, a floating seal having a configuration disclosed in, for example, Patent Document 1 has been proposed. In the floating seal with this conventional configuration, a fixed floating ring formed of metal material is elastically supported by an inner circumferential surface of a fixed housing through an elastic ring formed of nitrile rubber or the like. A rotating floating ring formed of the same metal material as that of the fixed floating ring is elastically supported by an inner circumferential surface of a rotating housing through an elastic ring formed of the same elastic material as that of the other elastic ring.

The floating rings are held together in a sealing state by the elasticity of the elastic rings. When the rotating housing is rotated, the floating rings slide with respect to each other. Since the floating rings are maintained in a tight contact state, oil is prevented from leaking from inside the housings.

Figure 8:
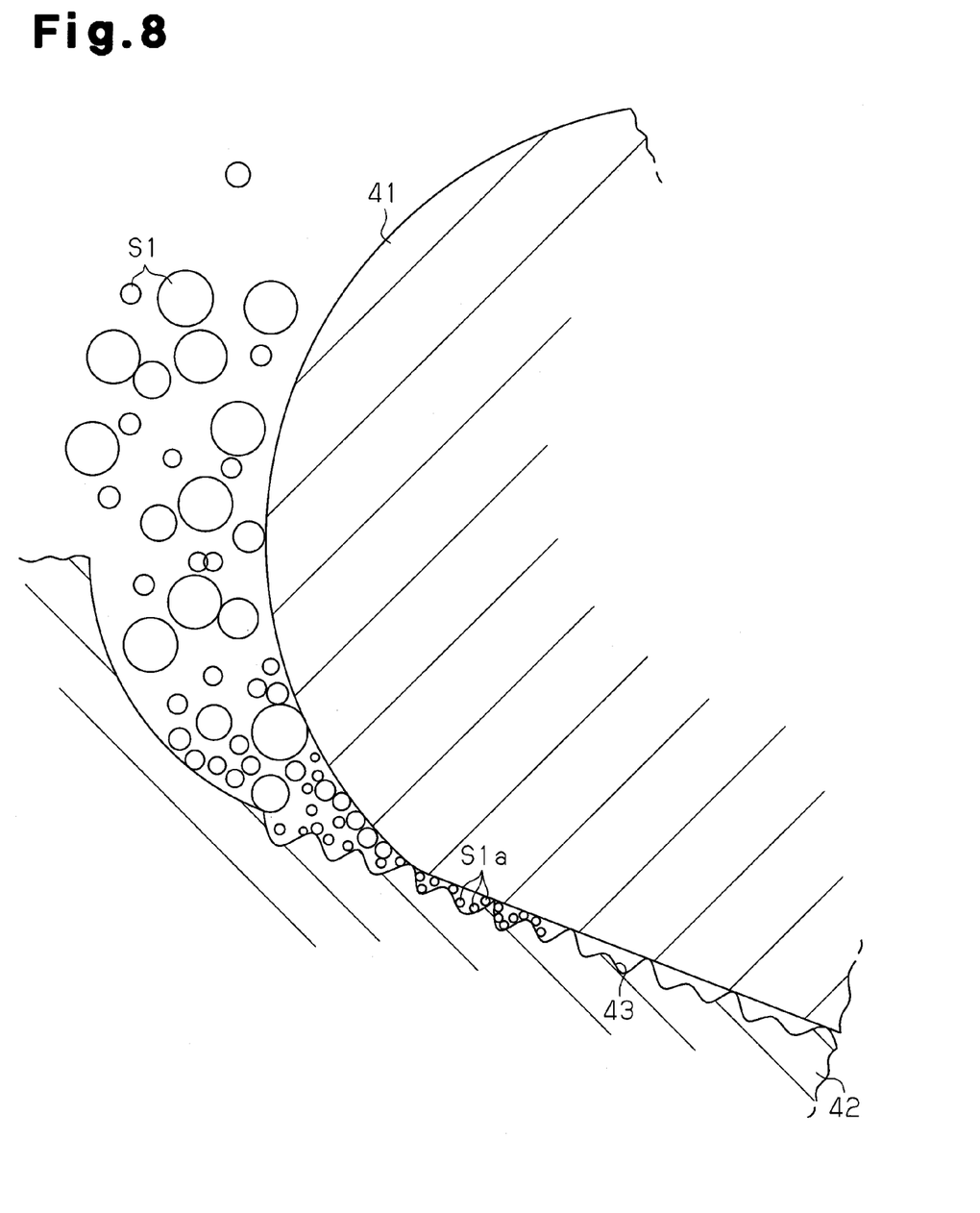
FIG. 8 is a cross-sectional view showing a portion of a conventional floating seal.

If the contact surface of any one of the elastic rings and that of the associated one of the floating rings of the floating seal slide with respect to each other, the elastic ring wears prematurely and thus becomes damaged. This degrades the performance of the elastic ring to apply elasticity to the floating ring, thus lowering the sealing performance of the floating ring. To avoid this problem, as illustrated in FIG. 8, for example, a rough surface 43 is formed on the contact surface of a floating ring 42 with respect to an elastic ring 41 to increase the friction coefficient. This prevents the elastic ring and the floating ring from sliding with respect to each other.
Patent Document 1: Japanese Laid-Open Utility Model Publication No. 62-25374

SUMMARY OF THE INVENTION

In the floating seal configured as shown in FIG. 8, the contact surface of the floating ring 42 with respect to the elastic ring 41 forms the rough surface 43, as has been described. If dirt S1 including fine grained soil S1a is introduced to the area around the floating ring 42, the rough surface 43 allows the fine grained soil S1a to easily enter the gap between the contact surface of the floating ring 42 and the contact surface of the elastic ring 41. This decreases the friction coefficient of the contact surfaces of the floating ring 42 and the elastic ring 41, allowing the floating ring 42 and the elastic ring 41 to easily slide with respect to each other. The elastic ring thus becomes worn and damaged.

To solve this problem, conventionally, a floating seal having a dust seal has been proposed. The dust seal seals a fixed housing and a rotating housing at outer circumferences of floating rings. However, the dust seal of this floating seal is not lubricated, the dust seal wears at an early stage and shortens the duration in which fine grained soil is effectively and sufficiently prevented from entering a gap between contact surfaces of a floating ring and an elastic ring.

In the floating seal described in Patent Document 1, an annular packing is arranged between each floating ring and the associated elastic ring. The inner circumferential surface of the packing is held in tight contact with the outer circumferential surface of the floating ring. The outer circumferential surface of the packing is held in tight contact with the inner circumferential surface of the associated housing. However, in this floating seal, the configuration of each housing and that of the floating ring must be modified to a great extent so as to ensure space each in the fixed and rotating housings to accommodate the packing. It is thus impossible to use the packing in combination with components of a typical floating seal.

The present invention addresses the problems of such conventional techniques. Accordingly, it is an objective of the invention to provide a floating seal that suppresses entry of fine grained soil into a gap between a contact surface of an elastic ring and a contact surface of a floating ring, thereby preventing the elastic ring from becoming worn and damaged by the fine grained soil.

It is another objective of the invention to provide a floating seal that prevents wear and damage of the elastic ring without substantially changing the configuration of a housing or the like.

To achieve the foregoing and in accordance with the invention according to claim 1, a floating seal including a pair of housings, which are relatively rotatable on a common axis, is provided. Each housing supports a floating ring with an elastic ring in between. The floating rings are slidably sealed together by the elasticity of the elastic rings. The floating seal is characterized in that, at a contact portion between each floating ring and the corresponding elastic ring and at least at a portion of each floating ring that is located closer to a sealing side, tight contact means is arranged in at least one of the floating ring and the elastic ring. The tight contact means maintains the contact portion in a tight contact state.

Accordingly, the tight contact means prevents fine grained soil from entering the gap between each elastic ring and the associated floating ring through a clearance between the housings. The elastic rings are thus prevented from prematurely becoming worn by the fine grained soil. Further, since the tight contact means is provided only in at least one of the floating ring or the elastic ring, it is unnecessary to modify the configurations of the housings or the like in correspondence with an additional component such as a packing, unlike the floating rings of Patent Document 1. It is preferable that the tight contact means be an elastic layer secured to the floating ring.

In this case, the elastic layer may be formed only on each of the floating seal. A tight seal structure is thus provided without changing the configurations of the components including the housing. The elastic layer refers to a layer formed of elastic and soft material, such as rubber-based material.

The elastic layers are preferably each arranged at the entire portion of the contact portion between one floating ring and the corresponding elastic ring.

This reliably increases the friction coefficient in the entire contact portion between each elastic ring and the elastic layer of the associated floating ring. It is thus unnecessary to grind the floating rings to ensure a high friction coefficient.

The tight contact means is preferably a smooth portion formed by making the portion located closer to the sealing side of the floating ring smoother than other portions of the floating ring.

This maintains each elastic ring and the associated floating ring in a tight contact state at the smooth portion.

The fine grained soil is thus prevented from entering the gap between the elastic ring and the floating ring. Further, since the smooth portion, which has increased smoothness, improves the tight contact performance between the elastic ring and the floating ring, the number of the components is prevented from increasing.

At the contact portion between each housing and the corresponding elastic ring and at least at the portion of each floating ring that is located closer to the sealing side, additional tight contact means is preferably arranged in the housing, the additional tight contact means maintaining the contact portion in a tight contact state.

The additional tight contact means prevents fine grained soil from entering the gap between each housing and the corresponding elastic ring.

The additional tight contact means is preferably an elastic layer secured to each housing.

Since the elastic layer is formed only on each of the housings, the tight seal structure is provided without changing the configurations of the components including the housings.

The elastic layers are preferably each formed on the entire portion of the contact portion of one housing and the corresponding elastic ring.

This reliably increases the friction coefficient in the entire portion of the contact portion between each elastic ring and the elastic layer of the corresponding housing. It is thus unnecessary to grind the housings to ensure a high friction coefficient.

The additional tight contact means is preferably a smooth portion formed by making the portion located closer to the sealing side of the floating ring smoother than other portions of the floating ring.

This maintains each elastic ring and the corresponding housing in a tight contact state at the smooth portion. The fine grained soil are thus prevented from entering the gap between the elastic ring and the housing.

The tight contact means is preferably a coating layer that is formed of a rubber material and coated on each elastic ring.

This elastically maintains the elastic rings and the corresponding housings in a tight contact state by means of the coating layers. Fine grained soil is thus prevented from entering the gaps between the elastic rings and the housings.

DETAILED DESCRIPTION OF THE PREFERRED EMBODIMENTS

Embodiments of the present invention, each of which is a carrier roller supporting a track chain of a crawler-type working machine such as a hydraulic shovel or a crawler dozer, will now be explained with reference to the attached drawings.

First Embodiment

A first embodiment of the invention will first be described with reference to FIGS. 1 to 3.

Figure 1:
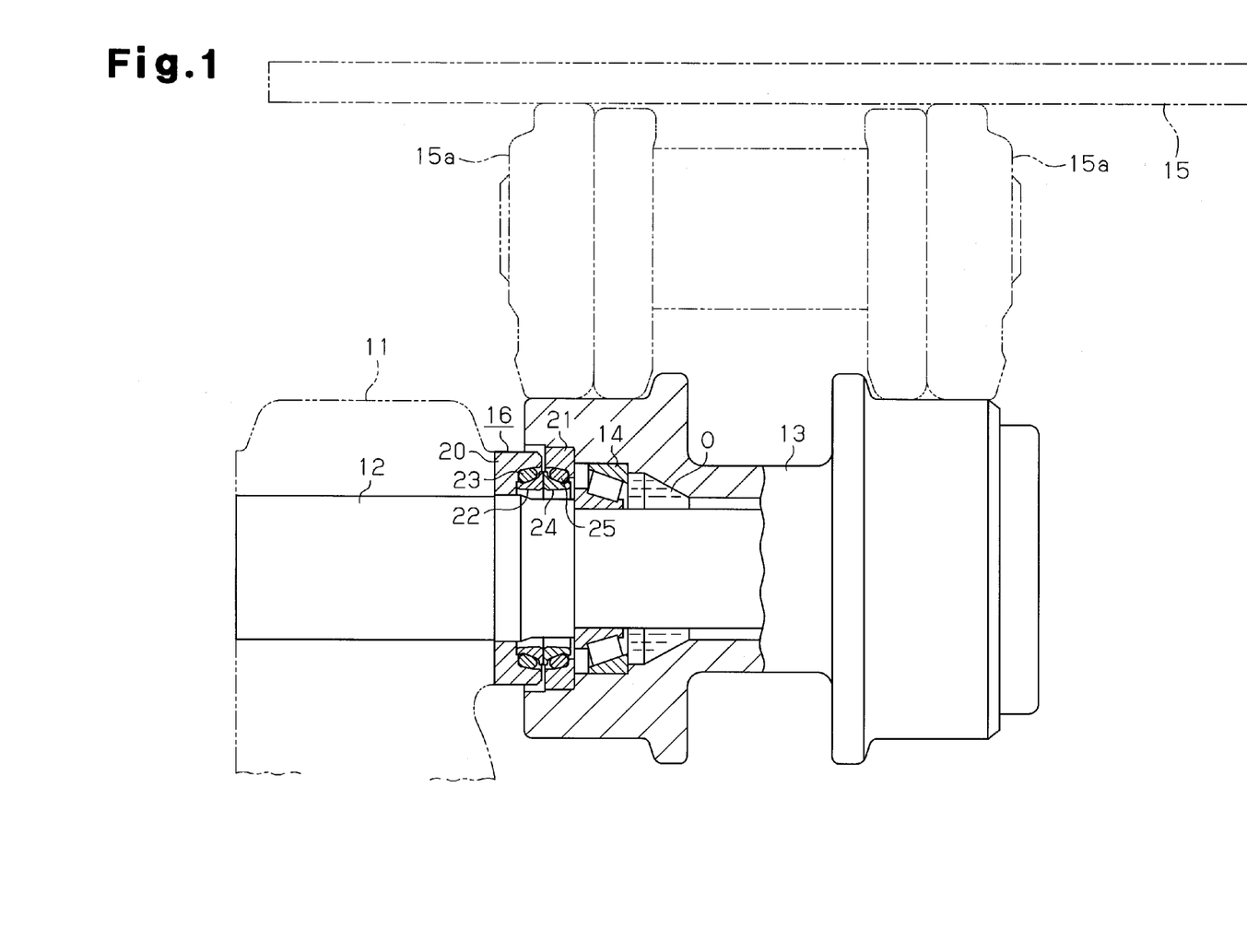
FIG. 1 is a partially cutaway side view showing a main portion of a first embodiment of the present invention, which is a carrier roller supporting a track chain of a lower traveling body of a crawler-type working machine.

As shown in FIG. 1, a fixed support shaft 12 is fixed to and projected from a side surface of a frame 11 of a lower traveling body of the crawler-type working machine. A carrier roller 13 is rotatably supported by the fixed support shaft 12 through a bearing 14. A non-illustrated drive wheel and a non-illustrated idler wheel are arranged in the frame 11 while being spaced at a predetermined interval. A track chain 15 is wound around the drive wheel and the idler wheel. Links 15a, which project from a non-contact surface of the track chain 15, are supported by the outer circumferential surface of the carrier roller 13.

With reference to FIG. 1, oil O, which lubricates rotatable components including the bearing 14, is received in the space between the carrier roller 13 and the fixed support shaft 12. A floating seal 16 is arranged between the outer circumferential surface of the fixed support shaft 12 and a proximal inner circumferential surface of the carrier roller 13. The floating seal 16 thus seals a proximal inner circumferential surface of the carrier roller 13 and prevents the oil O from leaking to the exterior.

The configuration of the floating seal 16 will hereafter be explained. As illustrated in FIGS. 1 and 2, a first housing 20, or a fixed housing, is arranged around and fixed to the outer circumferential surface of the fixed support shaft 12. A second housing 21, or a rotating housing, is engaged with and fixed to the proximal inner circumferential surface of the carrier roller 13 in such a manner that the second housing 21 is arranged in correspondence with and spaced by a predetermined interval from the first housing 20. An accommodating recess 20a is defined in the surface of the first housing 20 facing the second housing 21, and an accommodating recess 21a is defined in the opposing surface of the second housing 21.

A fixed floating ring 22 formed of metal material is elastically supported by the inner circumferential surface of the accommodating recess 20a of the first housing 20, or the fixed housing, through an elastic ring 23 formed of elastic material. A rotating floating ring 24 formed of the same metal material is elastically supported in the accommodating recess 21a of the second housing 21, or the rotating housing, through an elastic ring 25 formed of the same elastic material, in such a manner that the rotating floating ring 24 opposes and contacts the fixed floating ring 22 on a common axis. The elastic rings 23, 25 are each formed of rubber material such as nitrile rubber, fluororubber, silicone rubber, ethylene propylene rubber, or chloroprene rubber.

When the floating seal 16 and the elastic rings 23, 25 are assembled together, the elastic rings 23, 25 each become warped and deformed in the direction opposite to the direction of the corresponding arrow. The elastic rings 23, are thus maintained in the deformed state. This allows each of the elastic rings 23, 25 to accumulate elastic reactive force acting in the direction indicated by the corresponding one of the arrows in FIG. 2. The elastic reactive force of each elastic ring 23, 25 maintains the fixed and rotating floating rings 22, 24 in a tight contact state, or in a sealing state, at opposing portions 22a, 24a. The oil O is thus prevented from leaking. When the carrier roller 13 is rotated to rotate the second housing 21, or the rotating housing, relative to the first housing 20, or the fixed housing, the rotating floating ring 24 is also rotated. That is, the floating rings 22, 24 are rotated relative to each other while held in the sealing state between the opposing portions 22a, 24a of the floating rings 22, 24. This causes the opposing portions 22a, 24a to slide with respect to each other.

Figure 2:
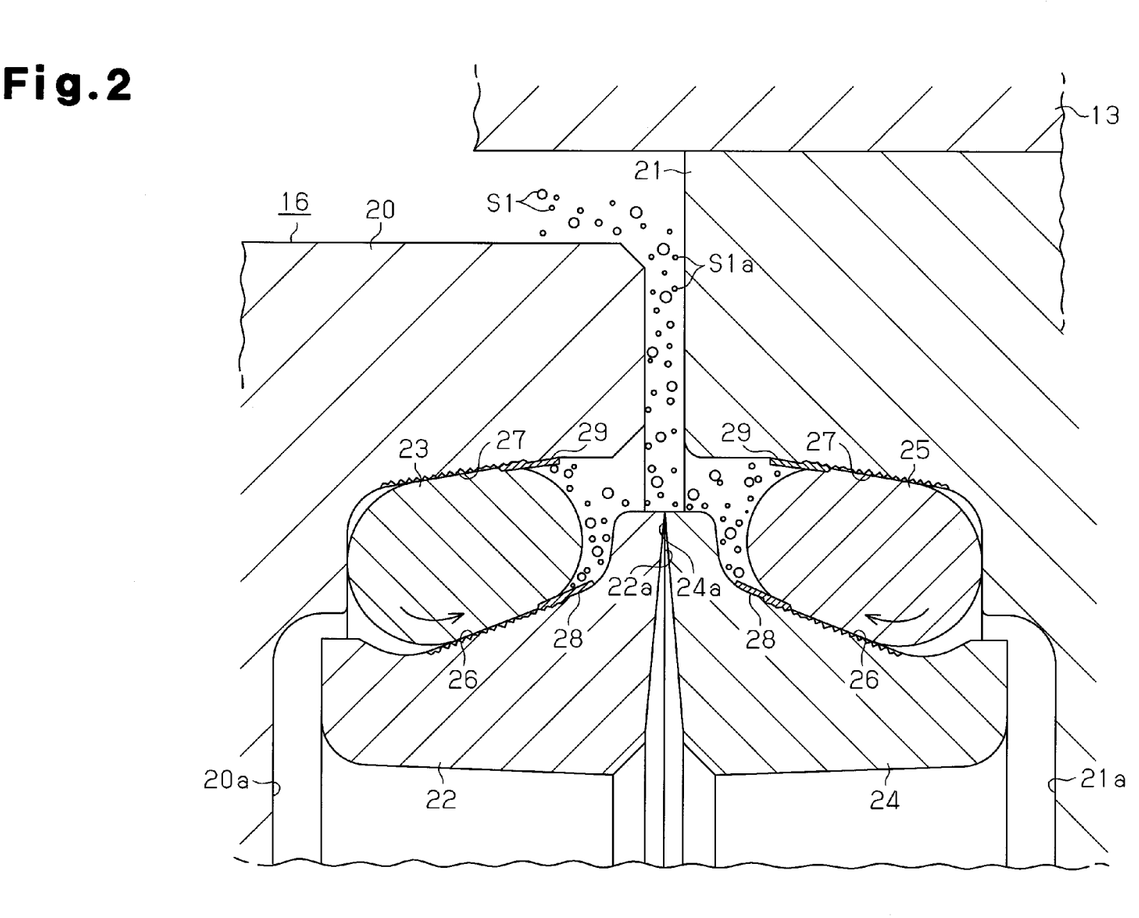
FIG. 2 is an enlarged cross-sectional view showing a portion of a floating seal of the carrier roller shown in FIG. 1.
Figure 3:
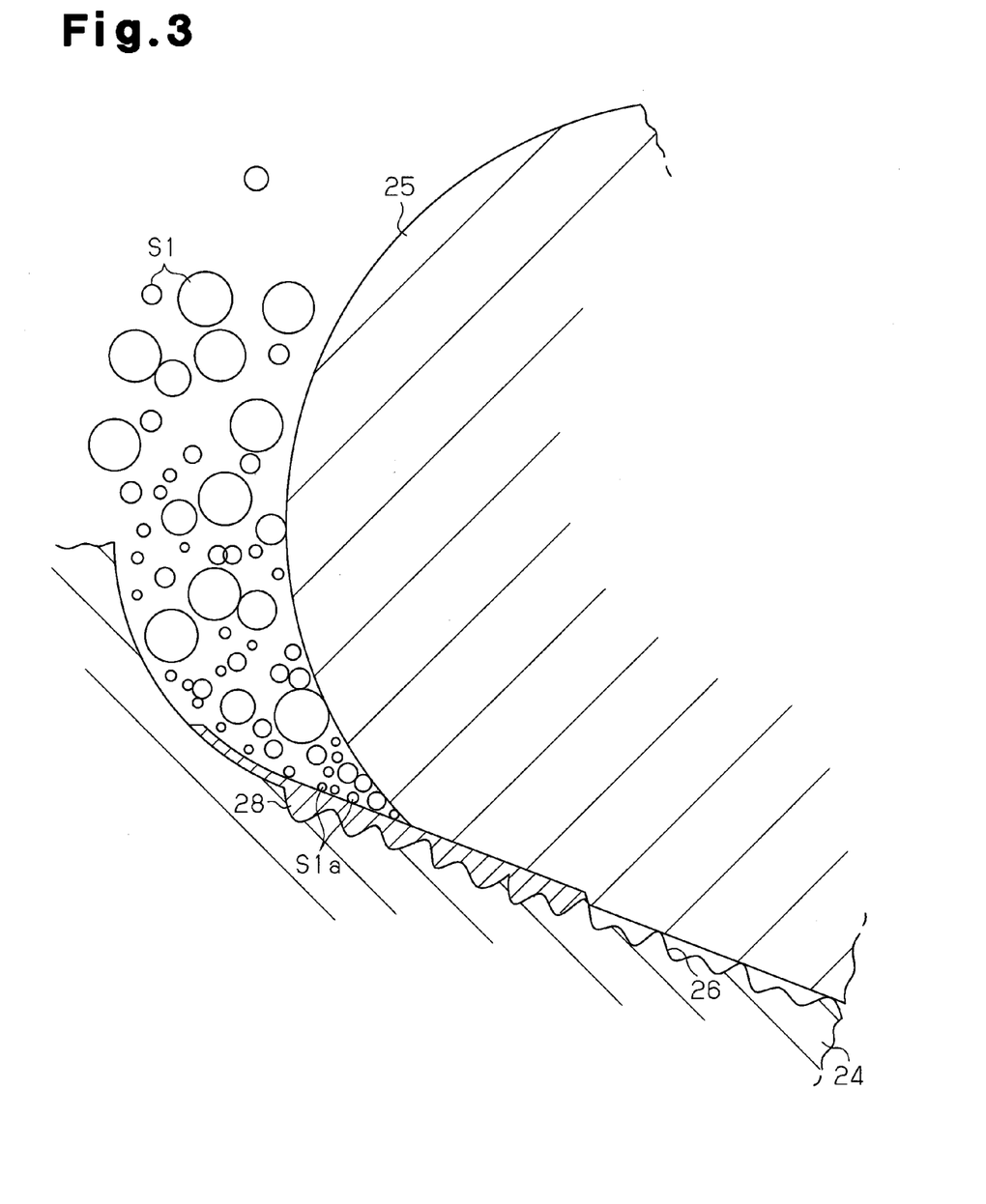
FIG. 3 is a further enlarged cross-sectional view showing the portion of the floating seal illustrated in FIG. 2.

As illustrated in FIGS. 2 and 3, a rough surface 26 is formed on an outer circumferential contact surface of each one of the floating rings 22, 24 facing the associated one of the elastic rings 23, 25 to increase the friction coefficient with respect to the elastic ring 23, 25. Similarly, a rough surface 27 is formed on an inner circumferential contact surface of each one of the housings 20, 21 opposing the associated one of the elastic rings 23, 25 to increase the friction coefficient with respect to the elastic ring 23, 25. The rough surfaces 26, 27 prevent the contact surfaces of the elastic rings 23, 25 and those of the floating rings 22, 24, as well as the contact surfaces of the elastic rings 23, 25 and those of the housings 20, 21, from sliding with respect to each other. The rough surface 27 of each housing 20, 21 and the rough surface 26 of each floating ring 22, 24 is finished to have a predetermined surface roughness (for example, the arithmetic mean height Ra according as specified in JIS B 0601-2001 is 15 to 20 μm) after having been molded. Alternatively, the rough surface 26 of each floating ring 22, 24 may have a surface roughness corresponding to 15 to 20 μm of the arithmetic average height Ra, as has been described, in an as-cast state. In this case, the rough surface 26 is not subjected to finishing. Then, the rough surfaces 26, 27 are then ground so that the surface roughness of each rough surface 26, 27 becomes greater (for example, the arithmetic average height Ra as specified in JIS B 0601-2001 is 25 to 50 μm) than the surface roughness of other portions.

With reference to FIGS. 2 and 3, a thin film-like elastic layer 28 serving as tight contact means is secured to a contact surface of a portion of the contact surface between each floating ring 22, 24 and the associated elastic ring 23, located near the opposing portion 22a, 24a (a sealing side) of the floating ring 22, 24. Similarly, another thin film-like elastic layer 29 serving as tight contact means is secured to a contact surface of a portion of the contact surface between each housing 20, 21 and the associated elastic ring 23, 25 located near the opposing portion 22a, 24a (the sealing side) of the corresponding floating ring 22, 24.

The elastic layers 28, 29 are each formed of the same elastic material as the elastic material of each elastic ring 23, 25. However, the molecular weight of the elastic material of each elastic layer 28, 29 is altered so that the material forming the elastic layer 28, 29 becomes slightly softer than that of the elastic ring 23, 25. Each elastic layer 28, 29 is secured to and coated on the contact surface including the corresponding rough surface 26, 27 of the floating ring 22, 24 or the housing 20, 21. The elastic layers 28, 29 are then deformed to bring the elastic layers 28, 29 into tight contact with the corresponding elastic rings 23, 25.

Such tight contact between the elastic layers 28, 29, and the corresponding elastic rings 23, 25 blocks the gaps between the contact surfaces of the elastic rings 23, 25 and those of the associated floating rings 22, 24 and the gaps between the contact surfaces of the elastic rings 23, 25 and those of the corresponding housings 20, 21. Thus, with reference to FIGS. 2 and 3, if dirt S1 including fine grained soil S1a is introduced into the gap between each elastic ring 23, 25 and the associated floating ring 22, 24 and the gap between the elastic ring 23, 25 and the associated housing 20, 21 through the clearance between the first housing 20 and the second housing 21, the fine grained soil S1a is prevented from entering between the contact surface of the elastic ring 23, 25 and the floating ring 22, 24 or between the contact surface of the elastic ring 23, 25 and the housing 20, 21. The friction coefficient of each rough surface 26, 27 is thus prevented from lowered by the fine grained soil S1a. This prevents premature wear and damage of each elastic ring 23, and restoration of the elastic ring 23, 25 to the original shapes caused by sliding of the contact surfaces. As a result, the elastic reactive force of each elastic ring 23, 25 is prevented from decreasing and the sealing performance between the floating rings 22, 24 is maintained.

The tight contact structure of the floating seal 16 with respect to the elastic rings 23, 25 is formed simply by coating the elastic layers 28, 29 on the contact surfaces of the floating rings 22, 24 and the contact surfaces of the housings 20, 21. Accordingly, the tight contact structure is provided using the components of the floating rings and the housings of the conventional floating seal without substantially modifying the configuration of each component.

The first embodiment, which has been described above, has the following advantages.

(1) The fine grained soil S1a are prevented from entering the gap between each elastic ring 23, 25 and the associated floating ring 22, 24 and the gap between the elastic ring 23, 25 and the associated housing 20, 21. This prevents each elastic ring 23, 25 from becoming prematurely worn and damaged. The elastic reactive force of the elastic ring 23, 25 is also prevented from decreasing. As a result, the sealing performance between the floating rings 22, 24 is maintained at a desirable level for a prolonged time.

(2) The elastic layers 28, 29 are simply coated on the contact surfaces of the floating rings 22, 24 and those of the housings 20, 21. It is thus substantially unnecessary to change the configurations of the components such as the floating rings 22, 24. Accordingly, not only change to the manufacturing steps is substantially unnecessary but also the above-described sealing performance is maintained effectively simply by replacing the housings and floating rings even in a case in which the conventional carrier roller is used.

(3) The elastic layers 28, 29 are less hard than the elastic rings 23, 25. Accordingly, the elastic layers 28, 29 are deformed to improve tight contact performance between the elastic layers 28, 29 and the elastic rings 23, 25. The fine grained soil S1a is thus effectively prevented from entering between the elastic layers 28, 29 and the elastic rings 23, 25.

(4) The elastic layers 28, 29 are formed of the same material as the material of each elastic ring 23, 25. This ensures desirable affinity between the elastic layers 28, 29 and the elastic rings 23, 25, thus increasing the friction coefficient between the elastic layers 28, 29 and the elastic rings 23, 25. The deformed shapes of the elastic rings 23, 25 are thus effectively maintained, while the sealing performance between the floating rings 22, 24 is effectively maintained.

Second Embodiment

Next, a second embodiment of the present invention will be explained. The differences from the first embodiment will mainly be discussed.

Figure 4:
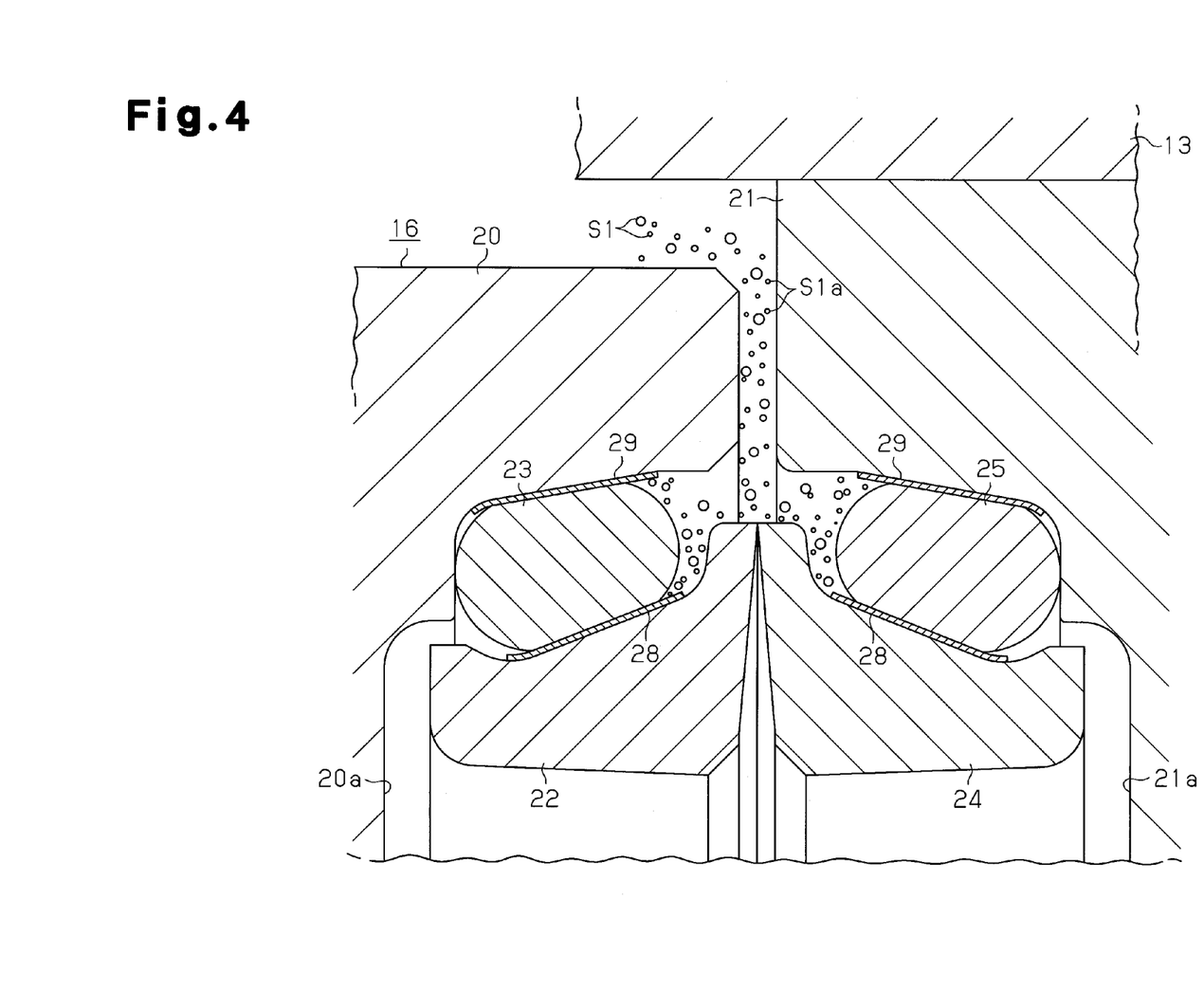
FIG. 4 is a cross-sectional view showing a portion of a floating seal according to a second embodiment.

In the second embodiment, as illustrated in FIG. 4, the elastic layers 28 are coated on and secured to the entire contact surfaces of the floating rings 22, 24 with respect to the elastic rings 23, 25, without forming the rough surfaces 26 of the first embodiment. Similarly, the elastic layers 29 are coated on and secured to the entire contact surfaces of the housings 20, 21 with respect to the elastic rings 23, 25, without forming the rough surfaces 27 of the first embodiment.

Accordingly, substantially as in the same manner as the first embodiment, the elastic layers 28, 29 are held in tight contact with the corresponding elastic rings 23, 25. This prevents the fine grained soil S1a from entering the gaps between the contact surfaces of the elastic rings 23, 25 and those of the floating rings 22, 24 and the gaps between the contact surfaces of the elastic rings 23, 25 and those of the housings 20, 21. The contact surfaces of the elastic rings 23, 25, the floating rings 22, 24, and the housings 20, 21 are thus prevented from sliding.

The second embodiment particularly has the following advantage in addition to the advantages of the first embodiment.

(5) The rough surfaces 26, 27 of the first embodiment are replaced by the elastic layers 28, 29 formed of the rubber material. Thus, even without the rough surfaces 26, 27, a high friction coefficient is ensured between the contact surface of each elastic ring 23, 25 and the contact surface of the associated floating ring 22, 24, as well as between the contact surface of the elastic ring 23, 25 and the contact surface of the housing 20, 21. This makes it unnecessary to machine the rough surfaces 26, 27, thus simplifying the manufacturing steps of the floating rings 22, 24 and the housings 20, 21.

Third Embodiment

A third embodiment of the present invention will hereafter be explained. The differences from the first embodiment will mainly be discussed.

Figure 5:
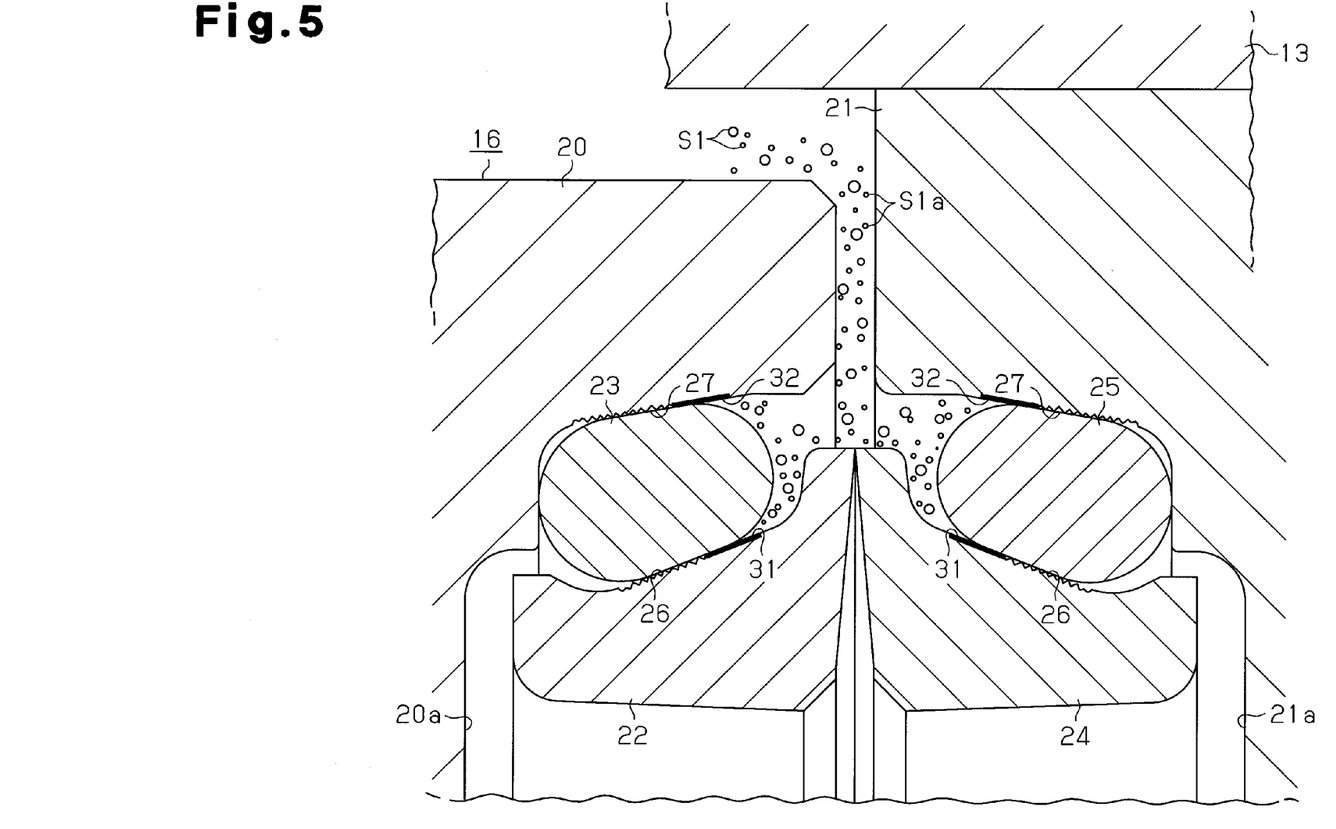
FIG. 5 is a cross-sectional view showing a portion of a floating seal according to a third embodiment.
Figure 6:
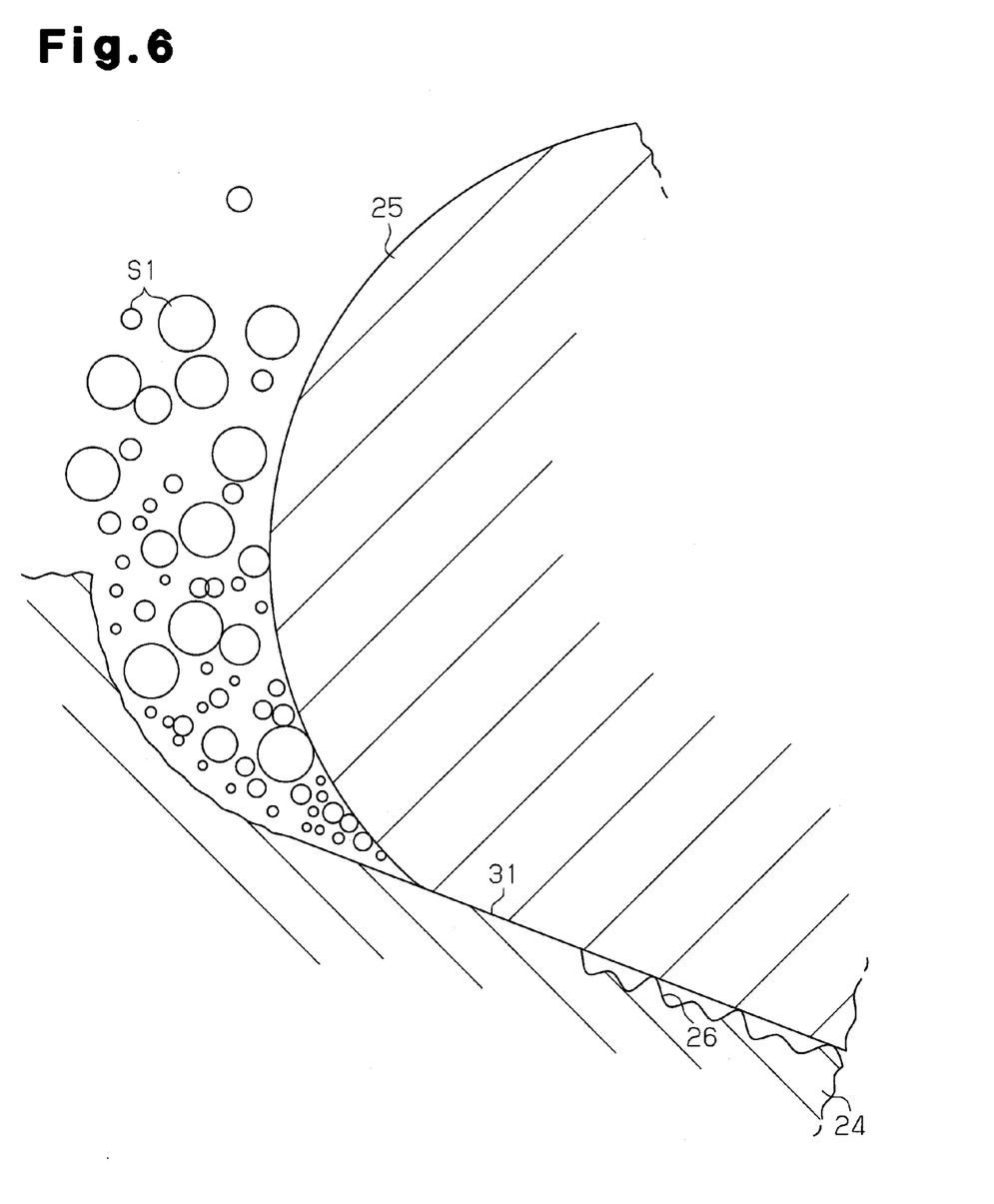
FIG. 6 is an enlarged cross-sectional view showing a portion of the floating seal illustrated in FIG. 6.

In the third embodiment, with reference to FIGS. 5 and 6, in the contact surface of each floating ring 22, 24 with respect to the associated elastic ring 23, 25, the surface roughness of the contact surface of the portion located closer to the sealing side of the floating ring 22, 24 is lower than the surface roughness of the remaining portion of the floating ring 22, 24. In other words, a machined smooth portion 31, or a smooth portion, with a surface roughness lower than that of the rough surface 26, is formed on the portion located closer to the sealing side of each floating ring 22, 24. Similarly, a machined smooth portion 32, or a smooth portion, with a surface roughness lower than that of the rough surface 27, is formed on the portion of the contact surface of each housing 20, 21 with respect to the associated elastic ring 23, 25 located closer to the sealing side of the corresponding floating ring 22, 24. Specifically, the surface roughness of each one of the machined smooth portions 31, 32 is, for example, approximately 2 to 6 μm of the arithmetic mean height Ra according to JIS B 0601-2001. The machined smooth portions 31, 32 are formed through grinding.

Accordingly, in the third embodiment, the machined smooth portions 31, 32 maintain the contact surfaces of the elastic rings 23, 25, the floating rings 22, 24, and the housings 20, 21 in mutual tight contact. This reduces the gap between the contact surface of each elastic ring 23, 25 and the contact surface of the associated floating ring 22, 24 and the gap between the contact surface of the elastic ring 23, 25 and the contact surface of the corresponding housing 20, 21. As a result, substantially as in the same manner as the first embodiment, the fine grained soil S1a is prevented from entering the gaps between the contact surfaces of the elastic rings 23, 25 and those of the floating rings 22, 24 and the gaps between the contact surfaces of the elastic rings 23, 25 and those of the housings 20, 21. The contact surfaces of the elastic rings 23, 25, the floating rings 22, 24, and the housings 20, 21 are thus prevented from sliding.

The third embodiment particularly has the following advantage in addition to the advantages of the items (1) and (2) of the first embodiment.

(6) The machined smooth portions 31, 32 are provided by grinding the floating rings 22, 24 or the housings 20, 21. This eliminates the necessity to provide a component specifically aimed to block the fine grained soil S1a, thus decreasing the number of the components. In other words, the floating seal is easily manufactured simply by adding a grinding step of the floating rings 22, 24 and the housings 20, 21 to the conventional machining steps.

Fourth Embodiment

A fourth embodiment of the present invention will now be described. The differences from the first embodiment will mainly be discussed.

Figure 7:
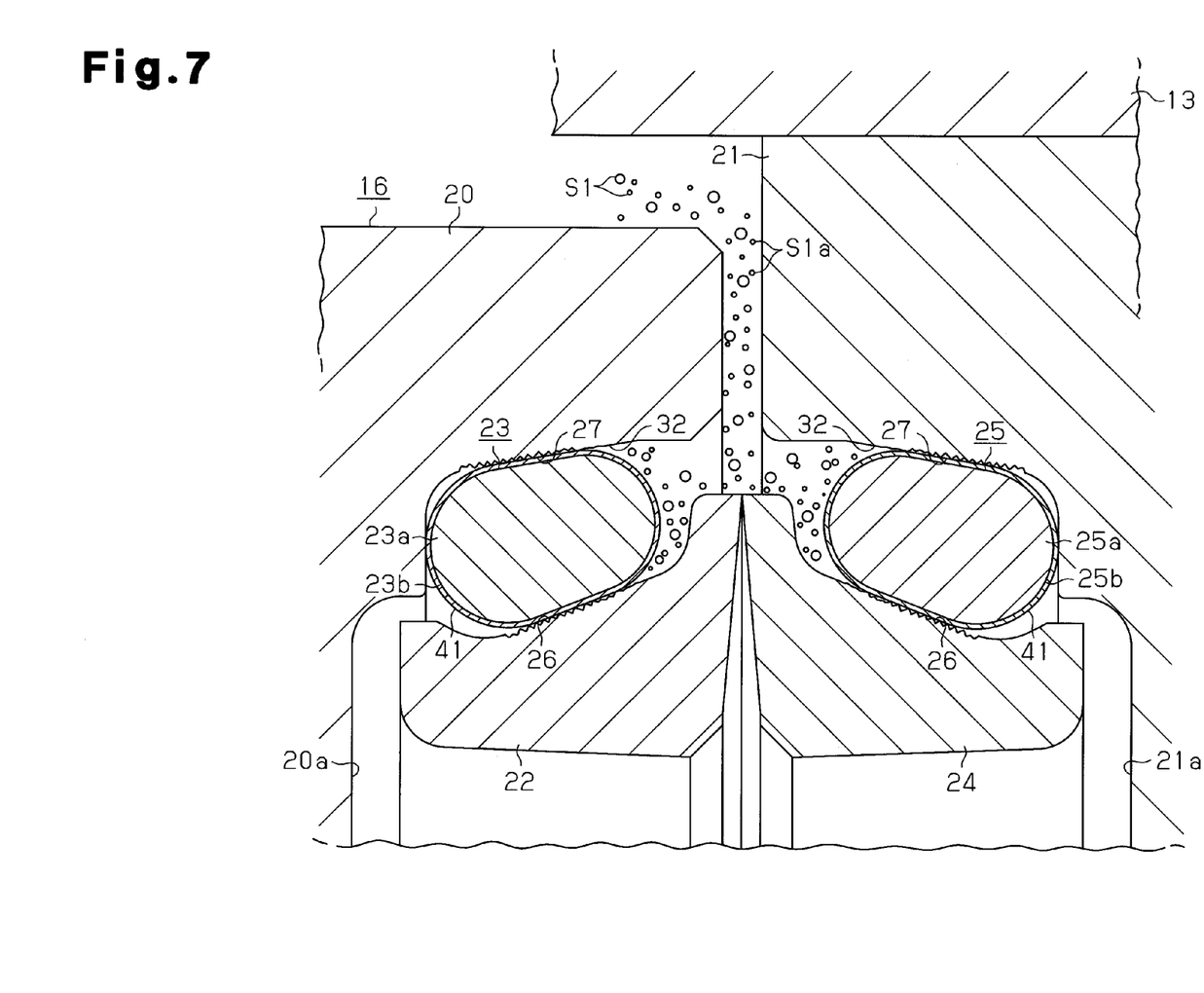
FIG. 7 is a cross-sectional view showing a portion of a floating seal according to a fourth embodiment.

In the fourth embodiment, as illustrated in FIG. 7, each of the elastic rings 23, 25 is configured by a body portion 23a, 25a and a coating layer 23b, 25b, which covers the entire outer circumferential surface of the associated body portion 23a, 25a. Each one of the coating layers 23b, 25b is formed of the same rubber material as the material forming each one of the body portions 23a, 25a but with reduced softness compared to the body portions 23a, 25a. The floating rings 22, 24 and the housings 20, 21 are configured in the same manners as the conventional configurations.

Accordingly, in the fourth embodiment, the coating layers 23b, 25b ensure tight contact performance among the contact portions of the elastic rings 23, 25, the floating rings 22, 24, and the housings 20, 21. This prevents the fine grained soil S1a from entering the gaps between the contact surfaces of the elastic rings 23, 25 and those of the floating rings 22, 24 and the gaps between the contact surfaces of the elastic rings 23, 25 and those of the housings 20, 21. The contact surfaces of the elastic rings 23, 25, the floating rings 22, 24, and the housings 20, 21 are thus prevented from sliding.

The fourth embodiment has the advantages substantially equivalent to the advantages of the items (1) to (3) of the first embodiment.

(Modifications)

The illustrated embodiments may be modified as follows.

In the first and second embodiments, elastic layers 28 may be formed only in the floating rings 22, 24.

In the third embodiment, the machined smooth portions 31, 32 may be provided only in the floating rings 22, 24.

The fourth embodiment may be combined with any one of the first to third embodiments. In these cases, the elastic rings 23, 25 of the fourth embodiment may be employed as the elastic rings 23, 25 of the first to third embodiments.

The material forming each elastic layer 28, 29 may be rubber with a high friction coefficient mixed with an additive such as a suitable compound.

The floating seal according to the present invention may be embodied as an oil seal structure of a rotary body other than the carrier roller of the illustrated embodiments, such as the drive wheel or the idler wheel or the track roller supporting the lower traveling portion of the track chain.

The invention claimed is:

1. A floating seal comprising a pair of housings, which are relatively rotatable on a common axis,
wherein each housing supports a floating ring with an elastic ring in between, the floating rings being slidably sealed together by the elasticity of the elastic rings, the floating seal further comprising,
at a contact portion between each floating ring and the corresponding elastic ring and at least at a portion of each floating ring that is located closer to a sealing side, tight contact means arranged in at least one of the floating ring and the elastic ring, the tight contact means maintaining the contact portion in a tight contact state, wherein a rough surface is formed on each of a contact surface of the floating ring that faces the elastic ring and a contact surface of the housing that faces elastic ring to prevent the elastic ring and the floating ring as well as the elastic ring and the housing from sliding with respect to each other and wherein the rough surface is located further from the sealing side of the floating ring than the tight contact means, wherein, at the contact portion between each housing and the corresponding elastic ring and at least at the portion of each floating ring that is located closer to the sealing side, additional tight contact means is arranged in the housing, the additional tight contact means maintaining the contact portion in a tight contact state, wherein the additional tight means is an elastic layer secured to each housing.

2. The floating seal according to claim 1, wherein the tight contact means is an elastic layer secured to each floating ring.

3. The floating seal according to claim 1, wherein the tight contact means is a smooth portion formed by making the portion located closer to the sealing side of the floating ring smoother than other portions of the floating ring.

4. A floating seal comprising:

first and second housings which are relatively rotatable on a common axis, each of the first and second housings defining a conical contact surface;

first and second floating rings coaxial with the first and second housings respectively, each of the first and second floating rings defining a conical contact surface and contact portions, the first and second floating rings positioned such that the contact portions oppose one another, a first elastic ring positioned between the first housing conical contact surface and the first floating ring conical contact surface and a second elastic ring positioned between the second housing conical contact surface and the second floating ring conical contact surface with the elasticity of the rings slidably sealing the floating rings together at the contact portions, at least the conical contact surfaces of the first and second floating rings each defining a rough surface which prevents the respective elastic ring and the floating ring from sliding with respect to each other, and first and second sealing contact areas, each sealing contact area sealing between the respective elastic ring and respective floating ring conical surface at a position between the respective rough surface and contact portion of the floating ring, wherein the conical contact surfaces of the first and second housings each define a rough surface which prevents the respective elastic ring and the housing from sliding with respect to each other, and third and fourth sealing contact areas seal between the respective elastic ring and housing, and wherein the third and fourth contact sealing areas are each defined by an elastic layer secured to the respective housing.

5. The floating seal according to claim 4, wherein each sealing contact area is defined by an elastic layer secured to the respective floating ring conical surface.

6. The floating seal according to claim 4, wherein each contact area is defined by a portion of the respective floating ring conical contact surface which is smoother than the respective rough surface.

* * * * *